(12) United States Patent
Lin

(10) Patent No.: US 10,618,128 B2
(45) Date of Patent: Apr. 14, 2020

(54) METHOD FOR CLOSING A HOLE IN A METAL ARTICLE

(71) Applicant: GENERAL ELECTRIC COMPANY, Schenectady, NY (US)

(72) Inventor: Dechao Lin, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 337 days.

(21) Appl. No.: 15/652,857

(22) Filed: Jul. 18, 2017

(65) Prior Publication Data

US 2019/0022784 A1 Jan. 24, 2019

(51) Int. Cl.
| | |
|---|---|
| *B23K 9/04* | (2006.01) |
| *B23K 9/23* | (2006.01) |
| *B23K 9/235* | (2006.01) |
| *B23K 35/02* | (2006.01) |
| *C23C 24/04* | (2006.01) |
| *C23C 4/12* | (2016.01) |
| *B23K 101/00* | (2006.01) |
| *B23K 103/08* | (2006.01) |

(52) U.S. Cl.
CPC .......... *B23K 9/042* (2013.01); *B23K 9/23* (2013.01); *B23K 9/235* (2013.01); *B23K 35/0294* (2013.01); *C23C 4/12* (2013.01); *C23C 24/04* (2013.01); *B23K 2101/001* (2018.08); *B23K 2103/08* (2018.08)

(58) Field of Classification Search
CPC .......... B23K 9/042; B23K 9/23; B23K 9/235; B23K 35/0294

USPC ....... 219/75, 121.14, 121.46, 121.47, 121.64
See application file for complete search history.

(56) References Cited

U.S. PATENT DOCUMENTS

| | | | |
|---|---|---|---|
| 6,333,484 B1 | 12/2001 | Foster et al. | |
| 6,883,700 B2 | 4/2005 | Kottilingam et al. | |
| 6,984,801 B2 | 1/2006 | Mega et al. | |
| 7,533,795 B2 | 5/2009 | Schaeffer et al. | |
| 2006/0131366 A1* | 6/2006 | Schaeffer | B23K 31/02 228/226 |
| 2011/0168679 A1* | 7/2011 | Qi | B23K 26/36 219/75 |

FOREIGN PATENT DOCUMENTS

JP H01107973 A * 4/1989

* cited by examiner

*Primary Examiner* — Thien S Tran
(74) *Attorney, Agent, or Firm* — McNees Wallace & Nurick LLC

(57) ABSTRACT

A method for closing a hole penetrating a hole height from a first surface of a metal article through a second surface of the metal article is disclosed including removing a portion of the metal article surrounding the hole from the metal article. The portion includes a depth extending from the first surface into the metal article and terminating prior to the second surface. Removing the portion forms a support surface within the hole adjacent and opposite to the second surface. A metal support structure is disposed within the hole on the support surface, and a metal composition is applied into the hole and onto the metal support structure. The metal support structure, the metal composition, and the metal article are fused together.

20 Claims, 2 Drawing Sheets

METHOD FOR CLOSING A HOLE IN A METAL ARTICLE

FIELD OF THE INVENTION

The present invention is directed to methods for closing holes in metal articles. More particularly, the present invention is directed to methods for closing holes in metal articles wherein a metal support structure is disposed within the hole.

BACKGROUND OF THE INVENTION

Precision articles of manufacture, such as gas turbine buckets may be manufactured or repaired with processes which require the formation of holes in between an outer surface of the bucket and an internal channel or cavity. Finishing the manufacture or repair of such articles may require closing the holes. However, depending on the material from which the article is formed, and the conformation of the hole, closing such holes may be difficult or costly. Typically welding techniques may undesirably deposit material into the internal channel or cavity beneath the hole. Other options for closing the hole, such as inserting a pre-sintered preform plug, may be economically inefficient due to the high cost of the pre-sintered preform material and the precise machining of the plug necessary for proper joining.

BRIEF DESCRIPTION OF THE INVENTION

In an exemplary embodiment, a method for closing a hole penetrating a hole height from a first surface of a metal article through a second surface of the metal article includes removing a portion of the metal article surrounding the hole from the metal article. The portion includes a depth extending from the first surface into the metal article and terminating prior to the second surface. Removing the portion forms a support surface within the hole adjacent and opposite to the second surface. A metal support structure is disposed within the hole on the support surface, and a metal composition is applied into the hole and onto the metal support structure. The metal support structure, the metal composition, and the metal article are fused together.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
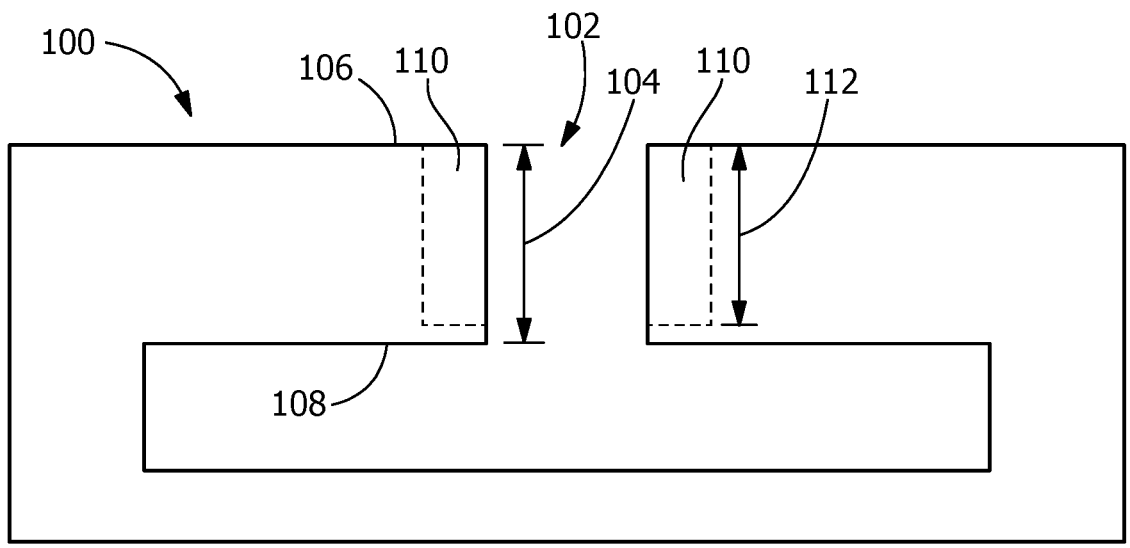
FIG. 1 is a cross-sectional view of a metal article including a hole, according to an embodiment of the present disclosure.
Figure 2:
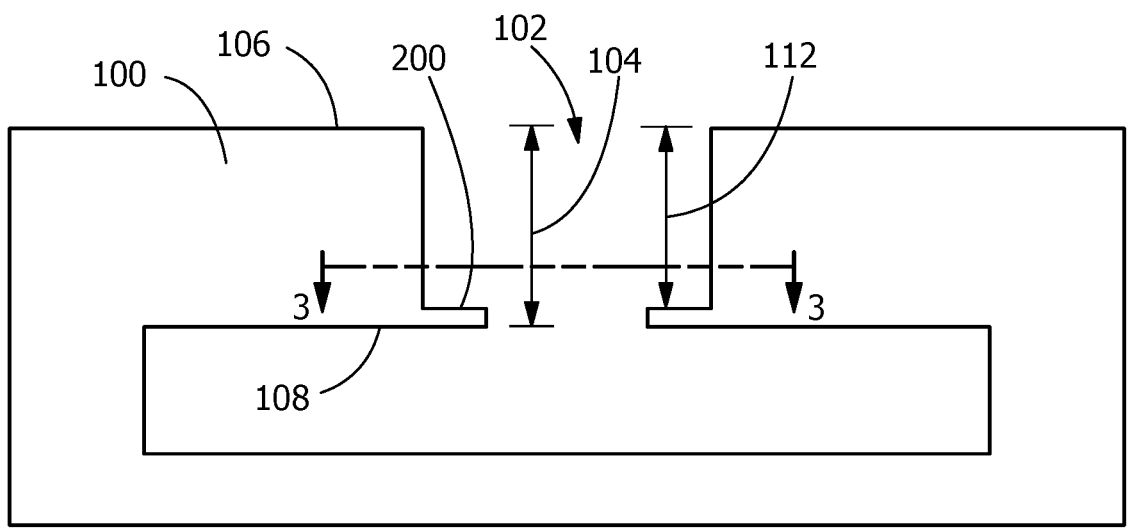
FIG. 2 is a cross-sectional view of the metal article of FIG. 1 following removal of a portion surrounding the hole, according to an embodiment of the present disclosure.

Provided are exemplary methods for closing holes in metal articles. Embodiments of the present disclosure, in comparison to articles and methods not utilizing one or more features disclosed herein, decrease costs, increase process control, increase process efficiency, or combinations thereof.

Referring to FIGS. 1-6, in one embodiment a method is disclosed for closing a hole 102 penetrating a hole height 104 from a first surface 106 of a metal article 100 through a second surface 108 of the metal article 100. The metal article 100 may be any suitable article, including, but not limited to, a turbine component. Suitable turbine components include, but are not limited to, hot gas path components, buckets (also known as blades), nozzles (also known as vanes), shrouds, combustors, combustion liners, transition pieces, and combinations thereof.

The metal article 100 may include any suitable material composition, including, but not limited to, superalloys, nickel-based superalloys, GTD 111, GTD 141, GTD 444, GTD 741, René 108, and combinations thereof. In one embodiment, the metal article 100 consists essentially of superalloys, nickel-based superalloys, GTD 111, GTD 141, GTD 444, GTD 741, René 108, or combinations thereof, excluding coating layers such as, but not limited to, bond coats, thermal barrier coatings, environmental barrier coatings, and combinations thereof.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel. GTD 111 is available from General Electric Company, 1 River Road, Schenectady, N.Y. 12345.

As used herein, "GTD 141" refers to an alloy including a composition, by weight, of about 13.8% chromium, about 9.4% cobalt, about 3.8% tungsten, about 4.8% titanium, about 2.8% aluminum, about 1.4% niobium, about 1.5% molybdenum, and a balance of nickel. GTD 141 is available from General Electric Company, 1 River Road, Schenectady, N.Y. 12345.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel. GTD 444 is available from General Electric Company, 1 River Road, Schenectady, N.Y. 12345.

As used herein, "GTD 741" refers to an alloy including a composition, by weight, of about 8.3% cobalt, about 0.2% iron, about 16% chromium, about 3.3% aluminum, about 3.4% titanium, about 2.6% tungsten, about 1.7% molybdenum, about 1.7% niobium, about 0.1% carbon, about 0.1% manganese, about 0.1% vanadium, and a balance of nickel.

GTD 741 is available from General Electric Company, 1 River Road, Schenectady, N.Y. 12345.

As used herein, "NIMONIC 263" refers to an alloy including a composition, by weight, of about 20% chromium, about 20% cobalt, about 6% molybdenum, about 2% titanium, about 0.5% aluminum, and a balance of nickel. NIMONIC 263 is available from Special Metals Corporation, 3200 Riverside Drive, Huntington, W. Va. 25720.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel. René 108 is commercially available under that designation Referring to FIGS. 1-3, a portion 110 of the metal article 100 surrounding the hole 102 is removed from the metal article 100. The portion 110 including a depth 112 extending from the first surface 106 into the metal article 100 and terminating prior to the second surface 108. Removing the portion 110 forms a support surface 200 within the hole 102 adjacent and opposite to the second surface 108.

Removing the portion 110 of the metal article 100 may include any suitable technique, including, but not limited to, machining, drilling, milling, CNC machining, electrical discharge machining, electro-chemical erosion, laser cutting, or combinations thereof.

The depth 112 may be any suitable measure, including, but not limited to between about 50% to about 99% of the hole height 104, alternatively between about 55% to about 98% of the hole height 104, alternatively between about 60% to about 97% of the hole height 104, alternatively between about 65% to about 96% of the hole height 104, alternatively between about 50% to about 75% of the hole height 104, alternatively between about 55% to about 80% of the hole height 104, alternatively between about 60% to about 85% of the hole height 104, alternatively between about 65% to about 90% of the hole height 104, alternatively between about 70% to about 95% of the hole height 104, alternatively between about 75% to about 99% of the hole height 104.

The support surface 200 may include any suitable conformation, including, but not limited to an annulus 300, a circular annulus (shown), an elliptical annulus, an irregular annulus, a triangular annulus, a rounded triangular annulus, a rectangular annulus, a rounded rectangular annulus, a square annulus, a rounded square annulus, or combinations thereof. In one embodiment, the conformation of the support surface 200 is about the same as the cross-sectional conformation of the hole 102. In another embodiment, the conformation of the support surface 200 is distinct from the cross-sectional conformation of the hole 102.

Figure 3:
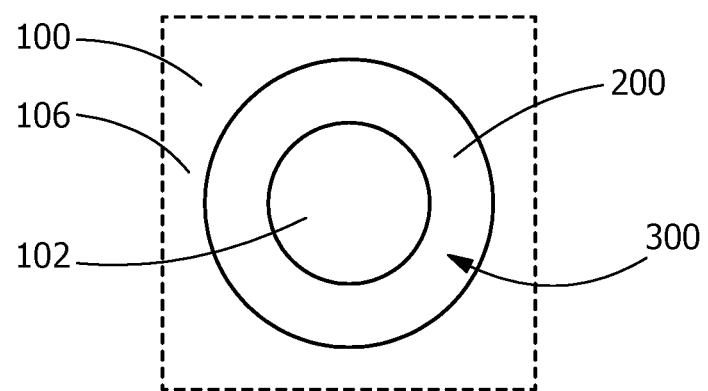
FIG. 3 is a perpendicular cross-sectional view of the metal article of FIG. 2 along lines 3-3, according to an embodiment of the present disclosure.
Figure 4:
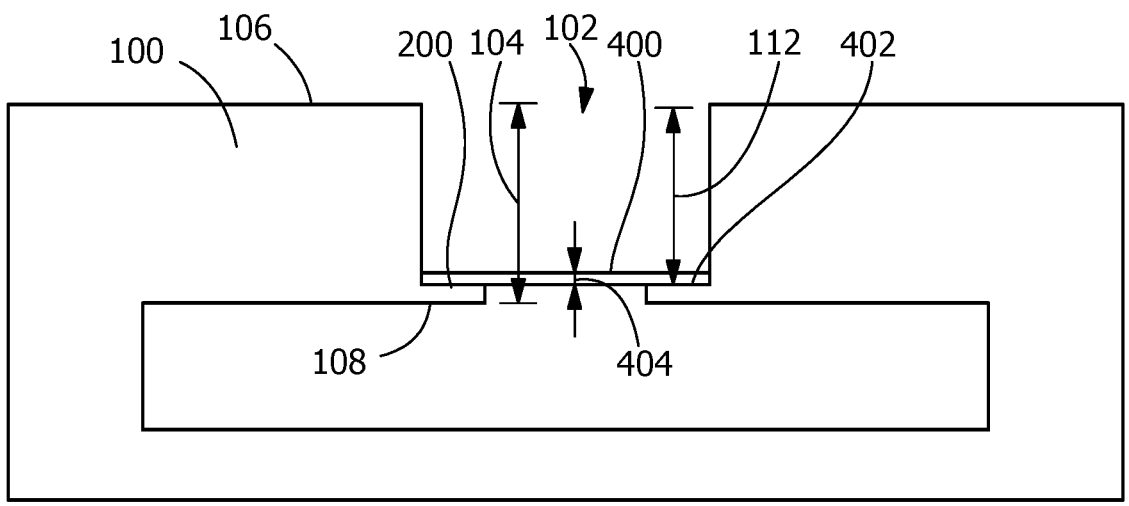
FIG. 4 is a cross-sectional view of the metal article of FIG. 2 following disposal of a metal support structure within the hole, according to an embodiment of the present disclosure.

Referring to FIGS. 3 and 4, a metal support structure 400 is disposed within the hole 102 on the support surface 200. The metal support structure 400 may include any suitable structure, including, but not limited to, a metal foil 402, a metal insert, a plurality of metal wire segments, a metal mesh, or combinations thereof.

The metal support structure 400 may include any suitable thickness 404, including, but not limited to, a thickness 404 of less than about 33% of the depth 112 of the portion 110, alternatively a thickness 404 of less than about 25% of the depth 112 of the portion 110, alternatively a thickness 404 of less than about 20% of the depth 112 of the portion 110, alternatively a thickness 404 of less than about 15% of the depth 112 of the portion 110, alternatively a thickness 404 of less than about 10% of the depth 112 of the portion 110, alternatively a thickness 404 of less than about 5% of the depth 112 of the portion 110, alternatively a thickness 404 of between about 0.1% and about 10% of the depth 112 of the portion 110, alternatively a thickness 404 of between about 0.5% and about 5% of the depth 112 of the portion 110, alternatively less than about 0.2 inches, alternatively less than about 0.1 inches, alternatively less than about 0.05 inches, alternatively less than about 0.02 inches, alternatively less than about 0.01 inches, alternatively less than about 0.005 inches, alternatively less than about 0.002 inches.

In one embodiment, disposing the metal support structure 400 within the hole 102 includes tack welding the metal support structure 400 to the metal article 100. In another embodiment, disposing the metal support structure 400 within the hole 102 includes physically securing the metal support structure 400 within the hole 102 by lateral compression of the metal support structure 400.

The metal support structure 400 may include any suitable material composition, including, but not limited to, weldable superalloys, matching alloys, NIMONIC 263, and combinations thereof. In one embodiment, the metal support structure 400 consists of weldable superalloys, matching alloys, NIMONIC 263, and combinations thereof. As used herein, a "weldable" superalloy indicates a superalloy which is able to be welded by conventional welding techniques with acceptable weld defect susceptibility (i.e., an alloy which does not exhibit liquidation, hot, and strain-age cracking, and which is therefore practical to weld). As used herein, a "matching" alloy indicates an alloy which consists essentially of the material composition of the metal article 100, excepting any impurities or de minimus variations in composition which might result from the same material being produced in separate batches or by a different manufacturer.

Figure 5:
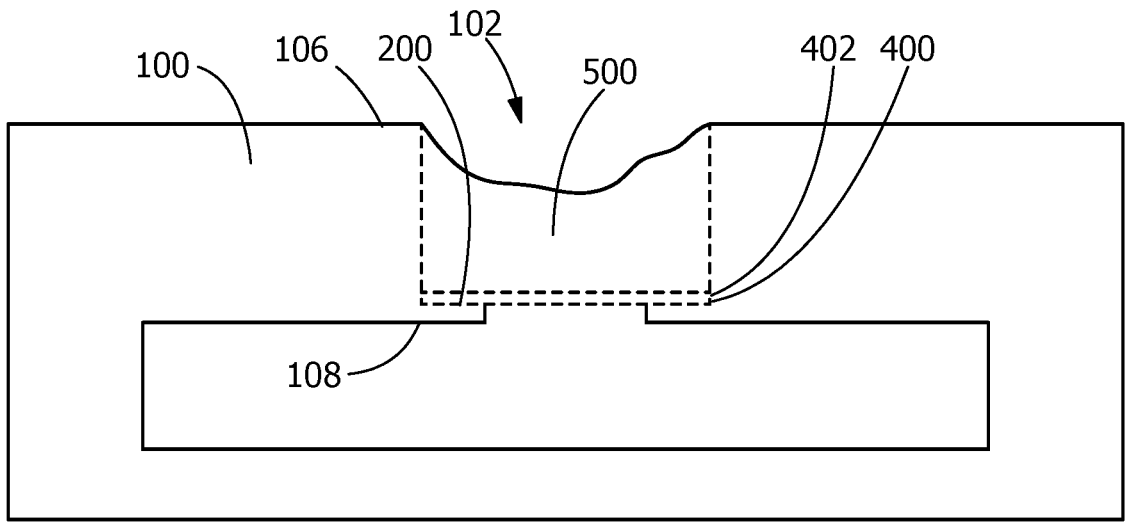
FIG. 5 is a cross-sectional view of the metal article of FIG. 4 during the application of a metal composition into the hole, according to an embodiment of the present disclosure.

Referring to FIGS. 4 and 5, a metal composition 500 is applied into the hole 102 and onto the metal support structure 400. Applying the metal composition 500 may include an additive welding technique. Suitable additive welding techniques include, but are not limited to, consumable electrode welding, scanning consumable electrode welding, gas metal arc welding, scanning gas metal arc welding, flux core arc welding, scanning flux core arc welding, metal core arc welding, scanning meal core arc welding, or combinations thereof.

The additive welding technique may include any suitable welding speed, including, but not limited to, a welding speed of between about 20 ipm to about 110 ipm, alternatively between about 30 ipm to about 100 ipm, alternatively between about 20 ipm to about 60 ipm, alternatively between about 40 ipm to about 80 ipm, alternatively between about 60 ipm to about 100 ipm, alternatively between about 80 ipm to about 110 ipm.

The metal composition 500 may include any suitable material composition, including, but not limited to, weldable superalloys, matching alloys, NIMONIC 263, and combinations thereof. In one embodiment, the metal composition 500 consists of weldable superalloys, matching alloys, NIMONIC 263, and combinations thereof. The metal composition 500 may include or consist of the same material composition as the metal support structure 400, or a distinct material composition.

In one embodiment, applying the metal composition 500 into the hole 102 includes filling the hole 102 with the metal composition 500. In another embodiment, applying the metal composition 500 includes overfilling the hole 102 with the metal composition 500, and subsequently removing excess metal composition 500.

In one embodiment, applying the metal composition 500 further includes at least one of cold spraying, combustion cold spraying, thermal spraying, high velocity oxygen fuel spraying, or high velocity air fuel spraying a sprayed composition. The sprayed compositions may be the metal composition 500 or be distinct from the metal composition 500. Without being bound by theory, it is believed that applying the sprayed composition with a spray technique following the additive welding technique may impart physical characteristics, including, but not limited to, oxidation resistance, surface structures, surface texture, or combinations thereof.

Figure 6:
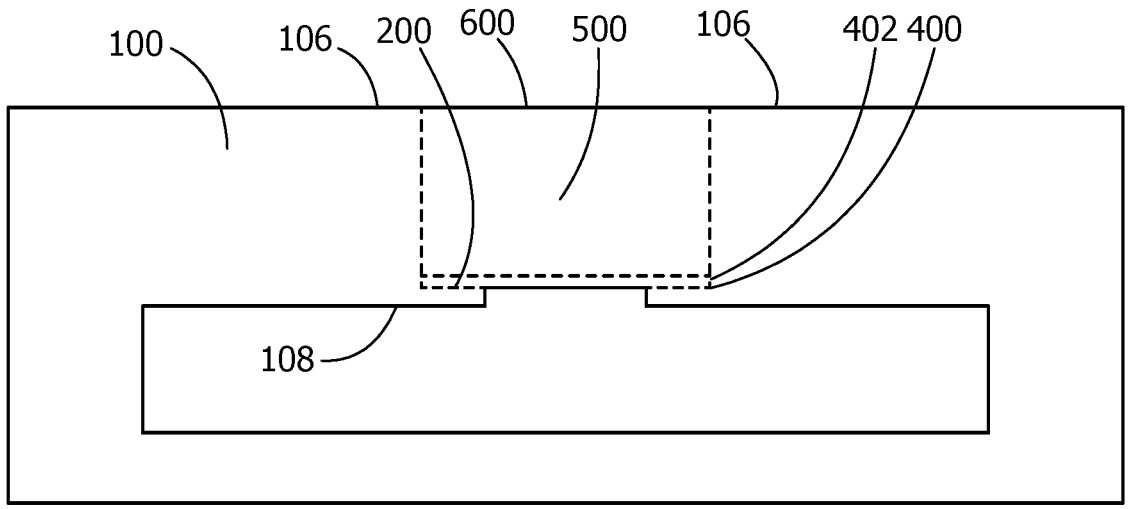
FIG. 6 is a cross-sectional view of the metal article of FIG. 5 following fusing the metal support structure, the metal composition, and the metal article together, according to an embodiment of the present disclosure.

Referring to FIGS. 5 and 6, the metal support structure 400, the metal composition 500, and the metal article 100 are fused together. In one embodiment, applying the metal composition 500 and fusing the metal support structure 400, the metal composition 500, and the metal article 100 together occurs substantially simultaneously. As used herein, "substantially" simultaneously indicates there may a delay from when applying the metal composition 500 commences to when fusing the metal support structure 400, the metal composition 500, and the metal article 100 together commences, but that fusing the metal support structure 400, the metal composition 500, and the metal article 100 together commences while the metal composition 500 is being applied. Further, there may be a delay from when applying the metal composition 500 ceases to when fusing the metal support structure 400, the metal composition 500, and the metal article 100 together ceases.

Fusing the metal support structure 400, the metal composition 500, and the metal article 100 may include any suitable maximum fusion depth, including, but not limited to, about 0.001 inches, alternatively about 0.002 inches, alternatively about 0.005 inches, alternatively about 0.01 inches, alternatively about 0.02 inches, alternatively about 0.05 inches, alternatively about 0.1 inches.

In one embodiment, closing the hole 102 is free of inserting a pre-sintered preform plug into the hole 102. In another embodiment, closing the hole 102 is free of inserting a metal plug having a plug height at least about 40% of the depth 112 of the portion 110 into the hole 102.

Closing the hole 102 may be essentially free of forming cracks. As used herein, "essentially" free of forming cracks indicates that any cracks forming during the closing of the hole 102 are less than about 0.03 inches in largest dimension, alternatively less than about 0.02 inches in largest dimension, alternatively less than about 0.01 inches in largest dimension.

Closing the hole 102 may form a substantially flush surface 600. As used herein, "substantially" flush indicates that between the first surface 106 of the metal article 100 and the metal composition 500 there is a variance of less than about 0.05 inches, alternatively less than about 0.02 inches, alternatively less than about 0.01 inches, alternatively less than about 0.005 inches, alternatively less than about 0.002 inches, alternatively less than about 0.001 inches. The substantially flush surface 600 may be flat or may continue a contour or conformation of the metal article 100.

In one embodiment, closing the hole 102 forms the substantially flush surface 600 in net shape while applying the metal composition 500 into the hole 102 and fusing the metal support structure 400, the metal composition 500, and the metal article 100. In another embodiment, closing the hole 102 further includes finishing the metal composition 500 to form the substantially flush surface 600. Finishing the metal composition 500 may include any suitable finishing technique, including, but not limited to, machining, polishing, abrasive blasting, burnishing, peening, electropolishing, grinding, etching, buffing, and combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for closing a hole penetrating a hole height from a first surface of a metal article through a second surface of the metal article, comprising:
   removing a portion of the metal article surrounding the hole from the metal article, the portion including a depth extending from the first surface into the metal article and terminating prior to the second surface, removing the portion forming a support surface within the hole adjacent and opposite to the second surface;
   disposing a metal support structure within the hole on the support surface;
   applying a metal composition into the hole and onto the metal support structure; and
   fusing the metal support structure, the metal composition, and the metal article together,
   wherein the metal support structure is selected from the group consisting of a metal foil, a metal insert having a thickness of less than about 20% of the depth of the portion, a plurality of metal wire segments, a metal mesh, and combinations thereof.

2. The method of claim 1, wherein applying the metal composition includes an additive welding technique.

3. The method of claim 2, wherein the additive welding technique is selected from the group consisting of consumable electrode welding, scanning consumable electrode welding, gas metal arc welding, scanning gas metal arc welding, flux core arc welding, scanning flux core arc welding, metal core arc welding, scanning metal core arc welding, and combinations thereof.

4. The method of claim 3, wherein the additive welding technique includes a welding speed of between about 20 ipm to about 110 ipm.

5. The method of claim 2, wherein applying the metal composition and fusing the metal support structure, the metal composition, and the metal article together occurs substantially simultaneously.

6. The method of claim 2, wherein applying the metal composition further includes at least one of cold spraying, combustion cold spraying, thermal spraying, high velocity oxygen fuel spraying, and high velocity air fuel spraying a sprayed composition.

7. The method of claim 1, wherein applying the metal composition into the hole includes filling the hole with the metal composition.

8. The method of claim 1, wherein fusing the metal support structure, the metal composition, and the metal article together includes a maximum fusion depth of about 0.01 inches.

9. The method of claim 1, wherein the support surface is an annulus.

10. The method of claim 1, wherein the metal support structure is selected from the group consisting of a metal foil, a plurality of metal wire segments, a metal mesh, and combinations thereof.

11. The method of claim 1, wherein the metal insert includes a thickness of less than about 0.05 inches.

12. The method of claim 1, wherein the depth of the portion is between about 50% to about 99% of the hole height.

13. The method of claim 1, wherein disposing the metal support structure within the hole includes tack welding the metal support structure to the metal article.

14. The method of claim 1, wherein disposing the metal support structure within the hole includes physically securing the metal support structure within the hole by lateral compression of the metal support structure.

15. The method of claim 1, wherein closing the hole is free of inserting a pre-sintered preform plug into the hole.

16. The method of claim 1, wherein closing the hole is free of inserting a metal plug having a plug height at least about 40% of the depth of the portion into the hole.

17. The method of claim 1, wherein closing the hole is essentially free of forming cracks.

18. The method of claim 1, wherein the metal article is a turbine component.

19. The method of claim 1, wherein the metal article includes a material composition selected from the group consisting of superalloys, nickel-based superalloys, GTD 111, GTD 141, GTD 444, GTD 741, René 108, and combinations thereof.

20. The method of claim 1, wherein the metal support structure and the metal composition independently include a material composition selected from the group consisting of weldable superalloys, matching alloys, NIMONIC 263, and combinations thereof.

* * * * *